(12) United States Patent
Banayan et al.

(10) Patent No.: US 9,331,566 B1
(45) Date of Patent: May 3, 2016

(54) ADAPTIVE AC POWER EXCHANGER

(71) Applicant: Adaptive Frequency Holdings, LLC, Compton, CA (US)

(72) Inventors: Aziz Banayan, Beverly Hills, CA (US); Cheng-pin Liu, New Taipei (TW); Robert White, Highlands Ranch, CO (US); John Flavin, Golden, CO (US)

(73) Assignee: Adaptive Frequency Holdings, LLC, Compton, CA (US)

( * ) Notice: Subject to any disclaimer, the term of this patent is extended or adjusted under 35 U.S.C. 154(b) by 0 days.

(21) Appl. No.: 14/723,108

(22) Filed: May 27, 2015

Related U.S. Application Data

(60) Provisional application No. 62/117,615, filed on Feb. 18, 2015.

(51) Int. Cl.
*H02M 1/42* (2007.01)
*H02M 1/44* (2007.01)

(52) U.S. Cl.
CPC . *H02M 1/42* (2013.01); *H02M 1/44* (2013.01)

(58) Field of Classification Search
CPC .......................... H02M 1/4208; H02M 5/458
USPC .................. 363/34, 37, 39, 40, 41, 44, 48, 89
See application file for complete search history.

(56) References Cited

U.S. PATENT DOCUMENTS

| 5,371,666 | A | * | 12/1994 | Miller | H02J 9/062 363/132 |
|---|---|---|---|---|---|
| 7,903,439 | B2 | * | 3/2011 | Oettinger | H02M 3/157 323/283 |
| 2009/0135629 | A1 | * | 5/2009 | Mancebo del Castillo Pagola | H02M 5/42 363/34 |
| 2012/0086382 | A1 | * | 4/2012 | Peto | H02M 5/458 318/729 |

* cited by examiner

*Primary Examiner* — Jeffrey Sterrett
(74) *Attorney, Agent, or Firm* — M. Kala Sarvaiya; Michael D. Harris; SoCal IP Law Group LLP

(57) ABSTRACT

An adaptive AC power exchanger generates stable 120 VAC 60 Hz power from variable grid input power nominally at 220 VAC and 50 Hz. The exchanger includes an AC-DC circuit stage coupled to receive the input AC current and generate a VDC output, and a DC-AC circuit stage to generate power for a load. The AC-DC stage includes an EMI filter and surge protection circuit, a 50 Hz rectifier and a power factor correction (PFC) circuit controlled by a PFC controller to yield a 400 VDC output coupled through a bulk capacitor stack to a common connection to generate a 200 VDC voltage node. The 200 VDC and 400 VDC voltages are coupled to the DC-AC circuit including a pulse width modulator; current load limiter; an LC filter having a capacitor, dual inductors and an inductor by-pass relay; and a load disconnect relay all controlled by an AC bridge controller.

30 Claims, 8 Drawing Sheets

ADAPTIVE AC POWER EXCHANGER

RELATED APPLICATIONS

This application claims priority based on U.S. Provisional Application No. 62/117,615, which was filed Feb. 18, 2015. This application also claims priority based on the U.S. Utility application Ser. No. 14/723,108, which was filed May 27, 2015.

BACKGROUND

1. Field

Electrical power conversion and more specifically an AC power exchanger that can adapt to the variable voltage and frequency characteristics from an electrical power grid source and generate a stable power output that could be used to power common household appliances designed to operate at the output power.

2. General Background and State of the Art

Many appliances such as washing machines, dryers, dishwashers and the like required generally stable power source, which in the United States would 120 VAC, 60 Hz power. This arises at least in part because the timing mechanism of the appliance is dependent on the frequency of the electrical power used to control the appliance. For example, the appliance will detect the frequency of the electrical power and use that frequency as a "clock" signal against which the sequencing and duration of various automatic operations will be set. Consequently, appliances which are made to operate on 60 Hz power will not function properly if the power is a different frequency such as 50 Hz. Other appliance functions such as driving the motor also require the 60 Hz output. The same is true for appliances manufactured to operate at 50 Hz when the source power is 60 Hz.

The conversion of power from 220 VAC, 50 Hz was described in U.S. Pat. No. 5,267,134. However, that patent did not take into account the reality of the variable frequency and voltage of the typical international power source and specifically the need to accept power from a power source that varied unpredictably, for example, around a 220 VAC nominal characteristic. In such cases, the voltage can vary from 180 VAC to as high as 300 VAC. As such, adaptors in consumer applications must be able to adapt to the input power and generate an output power that is voltage regulated with minimum of sine wave distortions and harmonics and be surge protected.

It has also been found that converters suitable for the consumer applications must maintain conventional power capabilities (about 15 amps) yet at the same time meet several often-conflicting requirements that preclude conventional approaches. For example, the adaptor must be compact to be able to fit physically in the limited spaces available to a consumer. Conventional converters are inherently large and bulky and are ill-suited for consumer applications. Also, consumer environments are subject to contamination by moisture (humidity), dust, lint, articles of clothing and the like that can seriously degrade the performance of the adaptor electronics, particularly in compact environments. Consequently, the adaptor electronics must be sealed for protection from such contaminants and obstructive items. Such sealing precludes the use of internal fans for cooling, a conventional approach to cooling converters. Therefore, passive conduction cooling of sufficient capacity must be devised. The adaptor must also be lightweight, preferable not more than ten to twelve pounds. Conventional converters incorporate heavy inductors and transformers and other components that result in converters that weigh as much as 50-60 pounds or more. In many environments, the conventional converter had to function reliably in high ambient temperature conditions thereby requiring noisy, robust active cooling systems.

Such approaches are incompatible with the requirements of consumer adaptors particularly where such adaptors are in enclosed or sealed environments where cooling is limited to reliance on passive cooling. Therefore, novel circuits and component selections were conceived to increase circuit efficiency from about 87% to 93% or more to reduce heat generation to a point where passive heat dissipation methods were sufficient to dissipate heat while maintaining output power.

A need, therefore, exists for an compact, lightweight and powerful adaptive AC power exchanger useful in a consumer environment that will accept unpredictably variable AC power available from a power utility grid and adapt that power to provide AC power at a stable, predictable level, for example, the 120 VAC, 60 Hz used by common household appliances made for the United States. In addition, there is a need to provide a converter that provides 15 amp power, which is the common current standard for most home circuits throughout the world. The variability of the power in many countries can include extended periods of time when there is no power available. The restoration of power may result in power surges that can cause damage to any connected appliance. Therefore, any converter should be able to accept large inrush currents for a brief period when power is restored after an outage, without damage to the converter circuitry while also protecting the connected appliance from such power surges. In addition, because the voltage can vary for example from as low as 180 VAC to as high as 280 VAC or even as high as 300 VAC for brief periods, the circuitry of any converter should be able to function as a voltage regulator to insure that the voltage output is maintained substantially at about 120 VAC.

There also is a need for a suitable converter to be able to function reliably in adverse environments, which may include dust or humidity, by sealing the housing containing the converter electronics. This also means that all internal moving parts including internal cooling fans be eliminated and heat dissipated without using active cooling such as fans in the enclosed converter circuitry housing.

Using conventional electronics in the consumer environment and applications described, additional problems arise that contribute to inefficiencies. For example, no load power losses contribute to significant performance inefficiencies. Specifically, when the AC input power is 220V, the VDC will be about 400 VDC. However, the suitable VDC for 120 VAC output is only 200 VDC. To provide 400 VDC will cause high circulation current on the circuit inductors and capacitors, which will produce switching loss and conduction loss. The high no load loss is a serious energy loss for home application as the load level would likely be very low most of time. Reducing that energy loss will also reduce heat generated and hence the need for passive instead of active heat dissipation.

A second problem is high power losses when the load level is high. Specifically, high VDC at the output of the A-D converter will require higher voltage ratings for IGBTs and MOSFETs and a higher inductance values for certain inductor components. Higher voltage IGBTs and MOSFETs result in conduction and switching losses in high current (high load) applications. The high inductance inductors also have high resistance resulting in high power losses in high load applications.

A third problem relates to high surge current loads, which can occur when high load appliances such as refrigerators, air-conditioners, vacuum cleaners and the like are attached. In such applications, the peak current on the inductors in response to the high surge current will cause saturation of the inductors, which in turn causes loss of inductance rendering the circuit vulnerable to damage.

A fourth issue relates damage that can occur in abnormal circumstances where a high DC voltage passes through the converter to the output, which can cause damage to the connected appliance (load) itself.

SUMMARY

An adaptive AC power exchanger is positioned between a power source on a power grid and a load such as a home appliance, for converting input AC power from the power grid source to output AC power for the load. The adaptive AC power exchanger includes an input EMI filter that receives the input AC power and filters high frequency noise generated internally by the adaptive AC power exchanger. The EMI filter also includes an inrush current control circuit for limiting the amplitude of the input AC power current when the input AC power is initially applied. The inrush control circuit functions in response to an inrush control signal from a PFC controller. A rectifier (approximately at the frequency of the input AC power) is coupled to the input EMI filter for generating rectified input power characterized by a rectified input current waveform and a rectified input voltage waveform. The rectifier also generates a rectified line voltage signal for the PFC controller.

A power factor correction circuit is coupled for receiving the rectified input power from the rectifier and the PFC control signals from the PFC controller to modify the rectified input power so that the waveform of the rectified input current follows the waveform of the rectified input voltage to provide a power factor of approximately one. The power factor correction circuit then generates a first DC voltage, which in an embodiment is 400 VDC. A plurality of capacitors connected in series between the first output DC voltage and a common connection to generate a second output DC voltage intermediate between the first DC voltage output and ground, which in the 400 VDC embodiment, is 200 VDC. A bias and balancing voltage circuit is coupled to the plurality of capacitors for maintaining the intermediate relationship of the second DC voltage between the first DC voltage and the common connection.

An AC output bridge (inverter) is coupled to receive the first and second DC voltages. The AC output bridge includes a pulse-width modulation circuit for generating output AC having a zero voltage crossing relative to the second DC voltage; a load current limit circuit coupled to receive the output AC and limit the cycle-to-cycle frequency at the switching frequency of the pulse-width modulation circuit and generate a load current limit signal; an output LC filter with two inductors and a capacitor (hereafter referred to as "dual inductor LC filter") coupled to the load current output AC, which includes a first inductor and a second inductor coupled in parallel with a bypass relay coupled to the parallel first and second inductors for decoupling the second inductor in response to an LC filter bypass control signal when the load limited AC current applied to a load is below a predefined level; and a load disconnect relay for disconnecting the load limited output AC from the load in response to a load disconnect control signal. In one embodiment, the AC output bridge generates 120 VAC, 60 Hz AC output power. The load disconnect relay provides surge protection for the plugged in appliance.

With respect to the above-described switching losses and ripple currents when the output AC bridge is biased with voltages that are higher than the requirements of a 120 VAC output, if an unnecessarily high voltage is used to bias the inverter (for example the 400 VDC from the PFC circuit) to create the 120 VAC output, the ripple currents increase in the inductors and capacitor of the inverter filter resulting in conduction losses. Higher voltages also increase switching losses.

Therefore, in an exemplary adaptive AC power exchanger, a supply bias voltage (effectively +/−200 VDC) for the AC output bridge (inverter) that is more suitable for the 120 VAC output is provided. This is accomplished by a stacked (series) capacitor configuration at the output of the PFC circuit. With the mid-voltage (200 VDC referenced to the common connection) of the capacitor stack used as the output AC waveform "zero" crossing-voltage, the bridge is effectively biased with +200 VDC (400 VDC referenced to the +200 VDC mid voltage) for the positive half cycle of the output, and −200 VDC (referenced between the mid voltage and ground) for the negative half cycle. Consequently, without using more elaborate and costly circuitry, the inverter is biased with lower and more desirable voltage levels to improve the efficiency of the inverter.

With respect to the two inductors of the output filter of the inverter, at light loads a higher value inductance is used to reduce the ripple currents. However, this higher value inductance functioning at the rated output current will necessarily require a substantially larger and heavier inductor. Consequently, a lower value inductor with a higher current capacity is switched on by the inductor bypass relay to increase the total current capacity of the parallel inductors comprising the output filter. A significant benefit of this parallel inductor arrangement with the bypass relay is that the high surge current to start some appliances will not exceed the capacity of the output inductors. Without this arrangement, the inductors would saturate resulting in very high peak currents (that do not flow to the load but are circulating internally), which risks catastrophic failure of the inverter. Because it is not predictable what a consumer will try to connect to the inverter output, the parallel inductor/bypass relay arrangement minimizes the risk of such a failure by increasing the capacity of the inductor currents without excessively increasing the size of the output filter inductors.

An AC output EMI filter is coupled to the load disconnect relay of the AC output bridge for filtering high frequency noise from the AC output power. The input to the AC output EMI filter also generates a voltage sense signal, which is coupled to the AC bridge controller, which is part of the AC output bridge circuit. The AC bridge controller is coupled to receive the voltage sense signal and the load current limit signal and generate a load disconnect control signal to open and close the load disconnect relay, an LC filter bypass control signal to open and close the output bypass relay, and at least one modulation control signal to control the modulation of the pulse-width modulation circuit.

In one embodiment, the power factor correction circuit can be configured to be bidirectional to enable the adaptive AC power exchanger to received DC power from a photovoltaic array coupled through a PV array interface to the first DC output capacitors of the power factor correction circuit. The modified configuration replaces the boost diodes in the phase A and phase B circuits of the power factor correction circuit with MOSFETs, the input rectifier bridge with MOSFETs, and a control algorithm programmed in the PFC controller is modified to enable bidirectional operation whereby power from the PV array can be directed to the load, or to the power grid or to both.

Another aspect is the incorporation of power factor correction or in the case of a photovoltaic array embodiment, bidirectional power factor correction, which causes the current waveform to follow the AC input voltage waveform so as to achieve a power factor of approximately one. Power factor correction has a positive impact on the power grid by providing power to the adaptive AC power exchanger with reduced power distribution losses in the grid, which effectively increases the capacity of the grid. Furthermore, any appliance powered by the adaptive AC power exchanger, will reflect/acquire the near unity power factor of the adaptive AC power exchanger as viewed from the grid, or in another perspective, will act as a harmonic filter eliminating the inefficiencies and losses caused by harmonics induced on the grid. This is significant with many utility providers where regulations require that the appliances be designed with higher power factor correction to prevent grid power losses and maximize the delivery of useful power. Using this adaptive AC power exchanger satisfies the requirements of many utility providers outside of North America. In other words, an appliance which would not otherwise meet regulatory requirements regarding power factor correction in countries outside North America would appear to the grid to be power factor corrected and hence compliant when powered through the described adaptive AC power exchanger.

In another embodiment, the adaptive AC power exchanger can be configured to be bidirectional so that it can accept solar power from an attached photovoltaic panel and provide all or some of the power required by an appliance plugged into the adaptive AC power exchanger or generate and provide power to the grid (power that would be said to the power utility) when power is not being provided to a plugged in appliance or the solar panel is generating more power than the adaptive AC power exchanger requires.

In still another embodiment, the adaptive AC power exchanger can incorporate an information management capability that may include remote communication capability. Specifically, because the power adaptive AC power exchanger is connected between the load (e.g., appliance) and the grid, information such as electricity usage, cost of operation of the appliance, times of usage, and other information can be obtained and transmitted through Bluetooth, Wi-Fi, or other communications means to remote receivers such as smart phones and the like to thereby enable the consumer to monitor the functioning and performance of the connected appliance remotely. The consumer then can devise schemes to utilize the appliance at certain times to save on energy cost. In yet another embodiment, the power and system monitor can be coupled to the AC output controller so that the user can modify the AC output controller program or correct firmware bugs and thereby remotely change the functioning of the adaptive AC power exchanger.

These, as well as other features will become apparent from the following detailed description considered together with the appended drawings.

DETAILED DESCRIPTION

Figure 1:
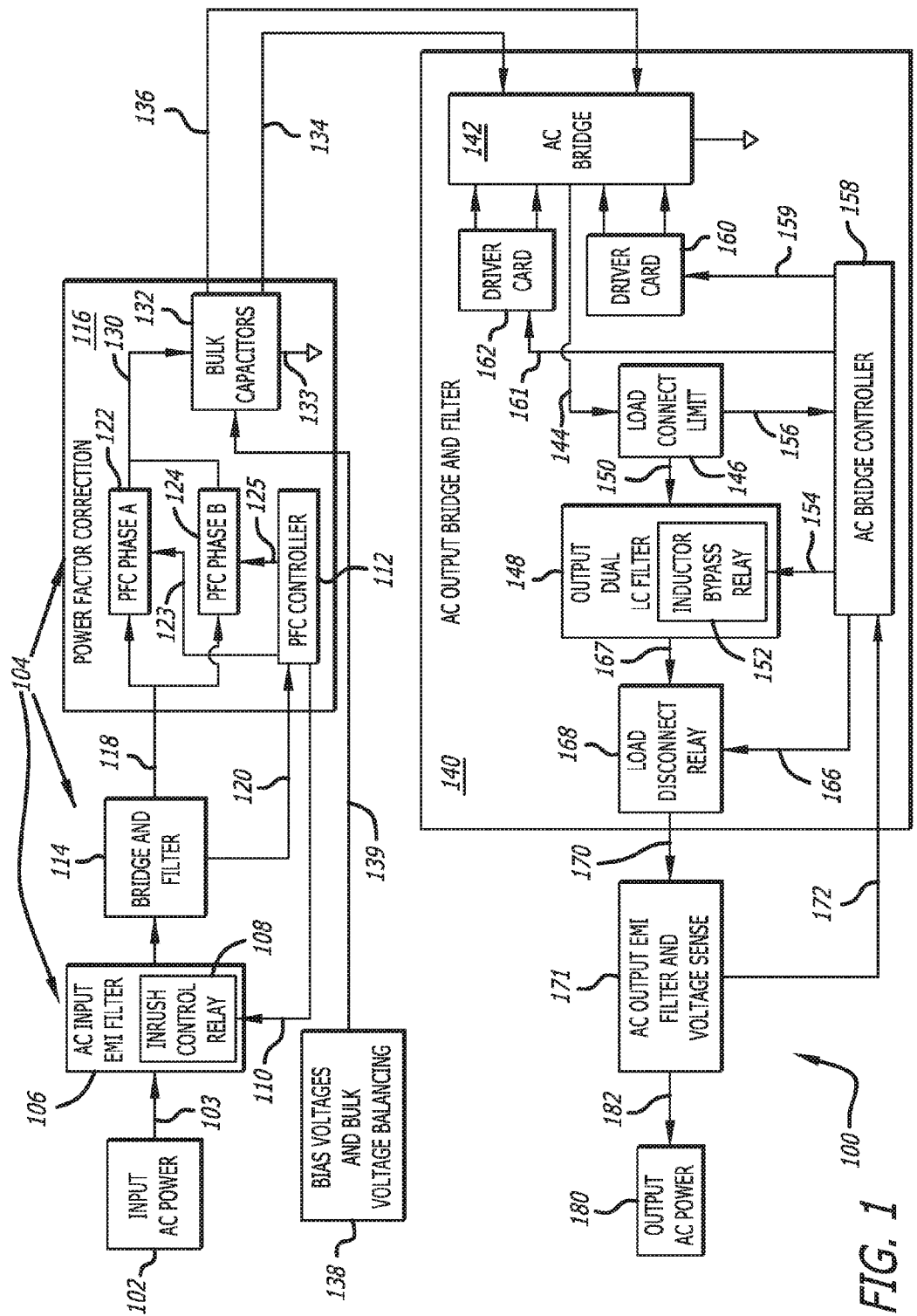
FIG. 1 is a block diagram illustrating an adaptive AC power exchanger.
Figure 3:
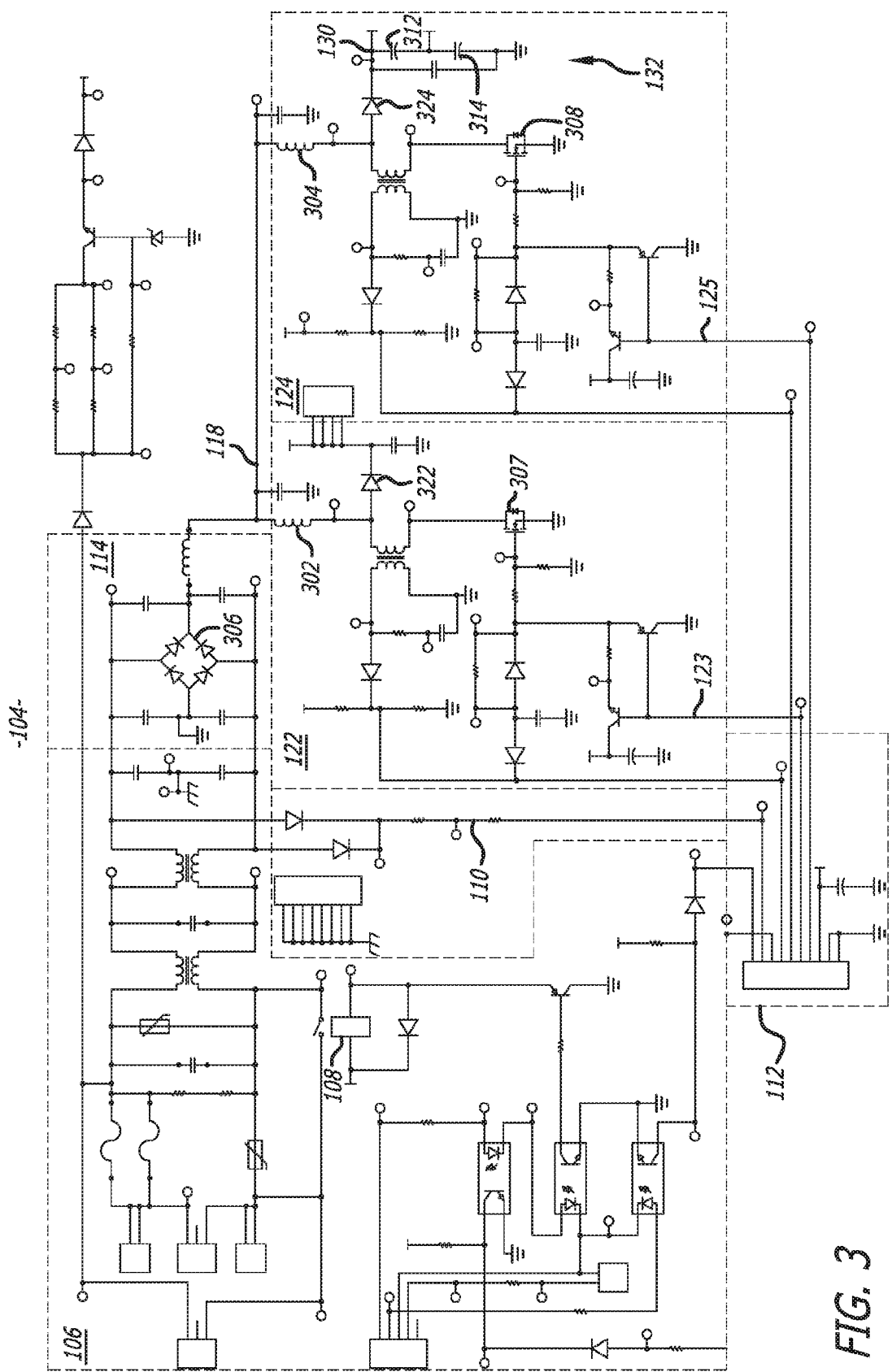
FIG. 3-5 are detailed electrical schematics drawing of the adaptive AC power exchanger illustrated in the block diagram of FIG. 1.
Figure 4:
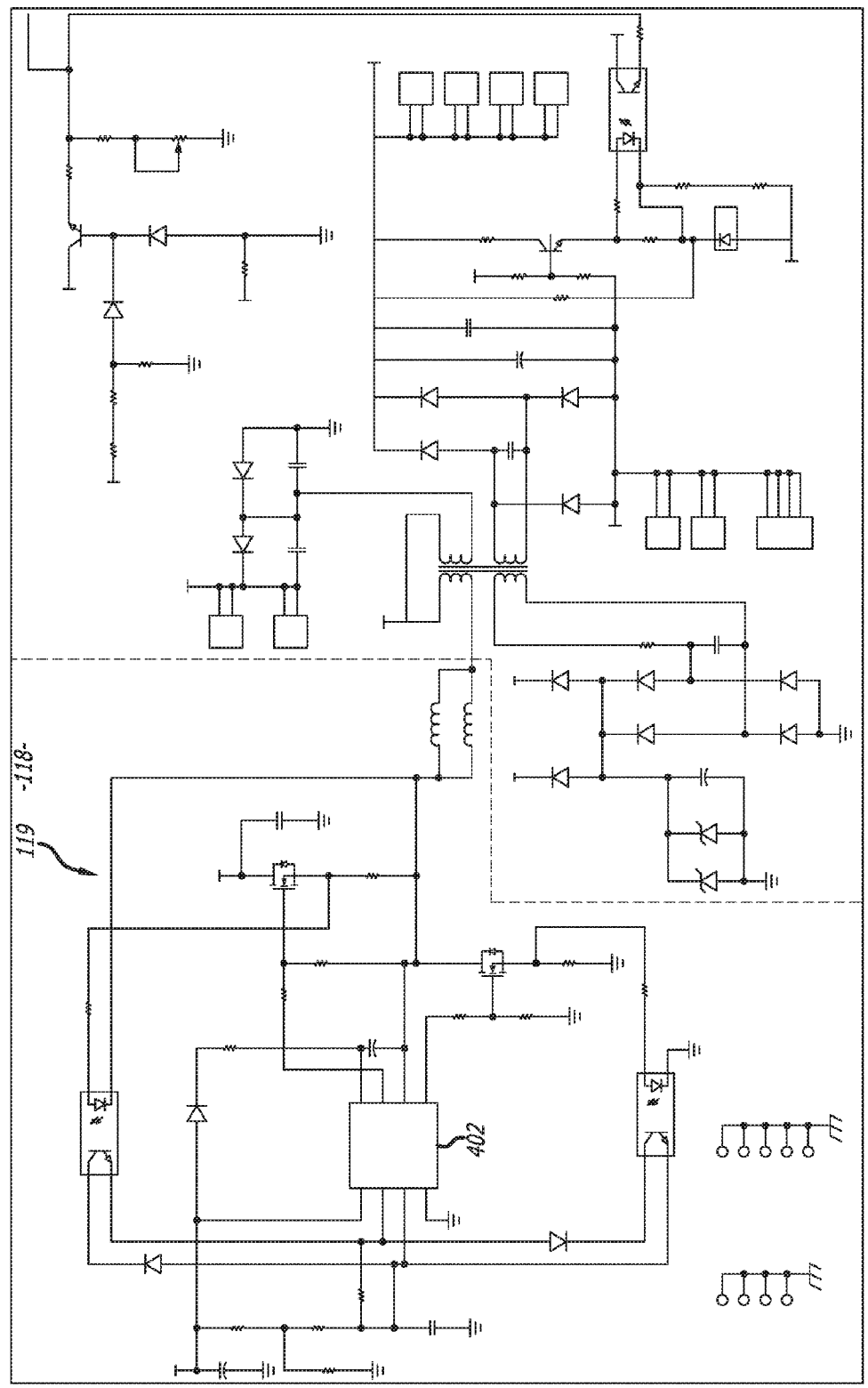
Figure 5:
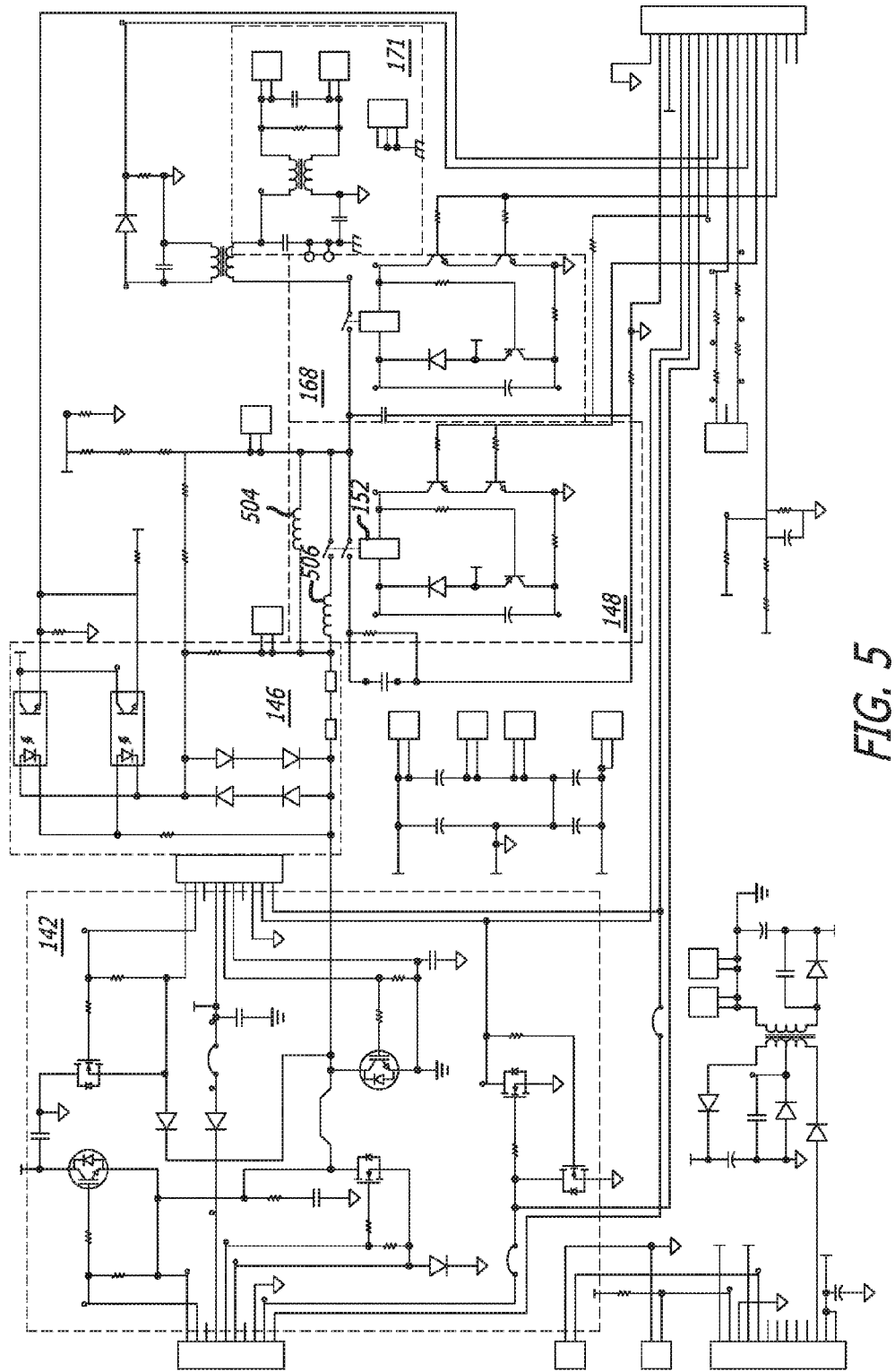

Referring to FIG. 1 in conjunction with the specific circuit embodiment shown in FIGS. 3-5, an adaptive AC power exchanger system 100 is coupled between an AC source 102 and a load 180 such as a home appliance. The AC source 102 may be a connection to a utility grid which, in the embodiment illustrated hereafter, will generally provide 220 VAC, 50 Hz power although the power may vary in both frequency and voltage over time. For example the voltage may vary from 180 VAC to 280 VAC and frequency from 40-60 Hz. Furthermore, the AC power provided on the grid by the utility may be intermittent.

The load 180 will generally be an appliance with motors, servos and the like as well as timing circuitry to control the sequence and timing of the motors and servos of the appliance. The power to drive those appliances must be substantially stable, in the embodiment illustrated, will be 120 VAC, 60 Hz. Accordingly the adaptive AC power exchanger must be able to accept power with variable power characteristics convert that power to a stable output power compatible with the requirements of home appliances such as vacuums, refrigerators, washers, dryers and the like and be able to function in an environment of power outages and surges when power is restored.

The adaptive AC power exchanger includes an input AC-DC power stage 104 which includes an AC input EMI filter 106 for filtering high frequency noise generated by the adaptive AC power exchanger 100 and preventing that noise from being reflected back onto the grid. The input EMI filter 106 includes an inrush control relay 108 for limiting the amplitude of the AC input current 103 flowing into a 50 Hz AC bridge (rectifier) and filter 114 in the AC-DC power stage 104. The inrush control relay 108 is open when the input AC power 103 is initially applied but closes thereafter in response to an inrush control signal 110 when the capacitors and other components that store power have had time to sufficiently charge. This insures that harmful power spikes and surges caused during the initial charging time after power is applied or restored will not harm other circuit components. The inrush control relay 108 therefore functions as surge protector for the adaptive AC power exchanger 100. The inrush control relay 108 is controlled by the inrush control signal 110 from a PFC controller 112 which includes a microprocessor programmed to control the functioning of the AC-DC power stage 104 in accordance with preselected criteria. The PFC controller 112 may for example be a Texas Instrument UCC28070A controller interconnected and programmed according to Texas Instruments' published applications notes for that controller.

The 50 Hz AC bridge and filter which is a rectifier circuit 114 generates rectified 220 VAC power 118 for a power factor correction (PFC) circuit 116. The rectified power 118 is characterized by a rectified input current waveform and a rectified input voltage waveform. The rectifier circuit 114 further generates a rectified line voltage signal 120 which is coupled as an input to the PFC controller circuit 112. The PFC circuit may be characterized by any of a number of topologies. However, in the exemplary embodiment shown, the PFC circuit 116 includes a PFC phase A circuit 122 and a PFC phase B circuit 124 which each receive the rectified power 118 from the rectifier 114.

The PFC controller 112 receives the rectified line voltage signal 120 and generates a first control signal 123 that is coupled to the PFC phase A circuit and a second control signal 125 coupled to the PFC phase B circuit to control the rectified input power 118 so that the rectified input current waveform follows the rectified input voltage waveform. Specifically, the phase A and Phase B circuits 122 and 124 are pulse width modulated under the control of the PFC controller 112 so that the average current flowing through the inductors (see FIG. 3, inductors 302 and 304 respectively) will have a current waveform that follows the AC input voltage waveform. The result is an input power factor of approximately one which represents the maximum power transfer efficiency from the grid to the adaptive AC power exchanger 100. The VDC output 130 of the power factor correction circuit 116 in the illustrated circuits of FIGS. 1-5 is 400 VDC.

The VDC output 130 is coupled to bulk capacitors 132 interconnected in series between the VDC output 130 and the common connection point 133, to provide a first VDC output 134 at the same voltage as the VDC output 130 and a second VDC output 136, intermediate between the common connection and the first VDC output 130 and more preferably having a voltage potential half of the voltage between VDC 134 and the common connection to define a bias null voltage for the inverter as above described. It is important for the creation of output power that has a stable voltage and frequency characteristic compatible with the requirements of the consumer appliance load that the second VDC output voltage be maintained as close as possible to half the voltage between the common connection voltage and the first VDC voltage 130. For example, if the first VDC voltage which in this disclosed embodiment is 400 VDC is reduced for a short period of time to 360 VDC, then the second VDC voltage must also decrease from 200 VDC to 180 VDC. In order to maintain the voltage of the second VDC output 136 at the midway point between the common connection voltage and the first VDC output 134, a bias voltage and companion bulk voltage balance circuit 138 generates a balancing current 139 which is coupled to the bulk capacitors 132. A representative bias voltage and bulk voltage balancing circuit 118 is illustrated in FIG. 4 where the balance portion of the circuit 119 includes a self-oscillating bridge driver 402 which may be a Fairchild FAN7387 driver although other similar bridge drivers are available from many other manufactures. The balancing circuit 119 creates a path and allows the +½ VDC energy 132 and −½ VDC energy 136 to transfer to each other when the capacitors 312 and 314 in FIG. 3 (collectively bulk capacitors 132) are not at the same voltage and thereby balance the output voltages 134 and 136.

Returning to FIG. 1, the first VDC output 134 and second VDC output 136 are coupled to a DC-AC stage 140, which includes a 60 Hz AC bridge inverter (pulse-width modulation) circuit 142 that converts the first VDC output voltage 134 (400 VDC) to a pulsating voltage with an amplitude of 400 volts and, for example, a frequency of 20 kHz. The width of the pulses are modulated in such way as to create a DC voltage of 200 VDC plus a 120 VAC, 60 Hz sine wave after being passed through output filter 148. Output filter 148 filters the harmonics of the switching frequency from the modulated output 144 to provide smooth 60 Hz output.

More specifically, the modulated AC output 144 is coupled to a load current limit circuit 146, which measures the current of the modulated AC output 144 and generates a load current limit signal 156, which is coupled to an AC bridge controller 158. The output 150 of the load current limit 146 is coupled to the output dual inductor LC filter 148.

Referring to FIG. 5, the output dual inductor LC filter 148 includes two inductors 504 and 506 coupled in parallel with a bypass relay 152 for decoupling, for example, inductor 506 in response to a bypass control signal 154. The bypass control signal 154 is generated by the AC bridge controller 158 in response to input signals from the load current limit circuit and an AC output EMI Filter 171 to enable the adaptive AC power exchanger 100 to dissipate less power and thereby operate with greater power efficiency as previously described.

Returning to FIG. 1, the output dual LC filter 148 generates a filtered and limited VAC output 167, which is coupled to a load disconnect relay 168. The load disconnect relay 168 disconnects the adaptive AC power exchanger 100 from the load 180 whenever a fault, that is, an unacceptable or harmful frequency, current or voltage, is sensed by the AC bridge controller 158. If no fault is sensed, the filtered and limited VAC power 170 at the output of the disconnect relay 168 is provided to the AC output EMI filter 171 which filters any high frequency noise on the VAC output 170. Such noise is generated internally by the switching circuitry of the adaptive AC power exchanger 100 and should be eliminated from the power actually provided to the load 180. In addition, the AC output EMI filter 171 generates the AC voltage signal 172, which is coupled to an AC bridge controller 158.

The AC bridge controller 158 is a microprocessor programmed to receive a load current limit signal 156 generated by the load current limit circuit 146 and an AC voltage signal 172 from the AC output EMI filter 171 and generates a first inverter control signal 161 and second inverter control signal 159 for a first driver 162 and second driver 160 respectively which control operation of the AC bridge (inverter) circuit 142; the bypass control signal 154 to control opening and closing the inductor bypass relay 152; and a load disconnect relay control signal 166 for controlling the load disconnect relay 168.

Referring again to FIG. 5, in an embodiment, the AC bridge 142 has a half-bridge topology that achieves a very low level of no load loss and higher efficiency when coupled to the dual LC filter 148, than, for example, a full-bridge topology. The inductor bypass relay 152 opens to disconnect inductor 506, and thereby increases the effective inductance when the load level is low, and thereby reduces the power loss due to inductor ripple current.

In operation, the AC bridge controller 158 is programmed to generated the control signals at the times and conditions selected to minimize power losses and to generate, in the embodiment illustrated, a stable 120 VAC, 60 Hz power output 182 for operating various appliances (e.g., load 180) regardless of the voltage and frequency of AC power 102.

Figure 2:
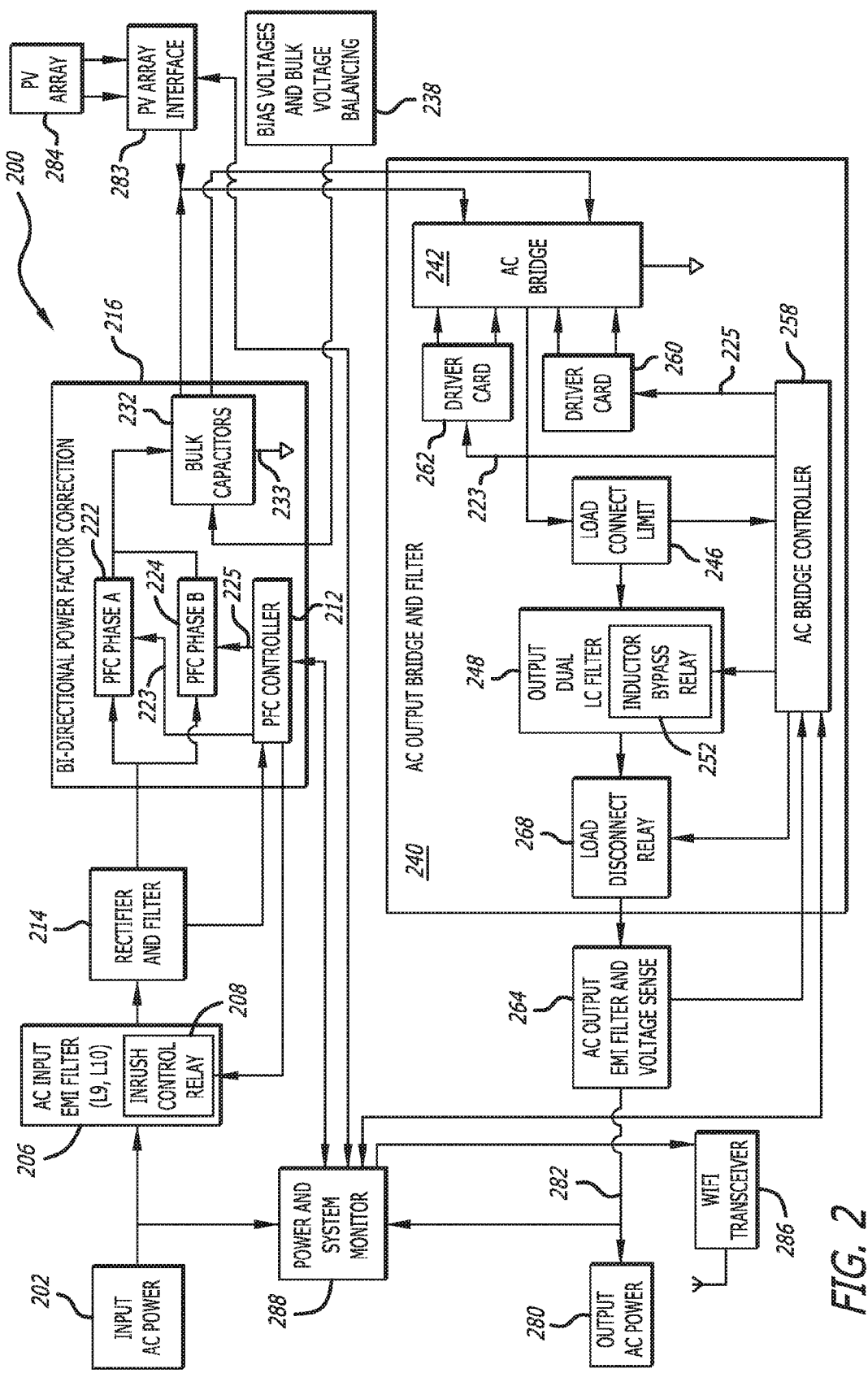
FIG. 2 is a block diagram illustrating an adaptive AC power exchanger with power monitor, Wi-Fi and solar power input.

Referring to FIG. 2, a bidirectional adaptive AC power exchanger 200 additionally includes a power and system monitor 288, a transceiver 286 (such as Wi-Fi or Bluetooth) and a photovoltaic (PV) array interface 283 coupled to an external PV array 284 and a bidirectional power factor correction circuit 216 to be described hereafter. Like the embodiment of FIG. 1, the bidirectional adaptive AC power exchanger is coupled to receive power from an input AC source 202 (characterized, for example, by variable 220 VAC, 50 Hz power); an AC input EMI filter 206 including an inrush control relay 208; an AC-DC rectifier 114; a bias voltage and bulk voltage balancing circuit 238; an AC output bridge (inverter) and filter circuit 240 comprising the pulse width modulator 242, drivers 260 and 262, load current limit 246, output dual inductor LC filter 248, inductor bypass relay 252, load disconnect relay 268 and AC bridge controller 258; and an AC output EMI filter 264 essentially the same as the corresponding parts of the adaptive AC power exchanger circuit 100 described in FIG. 1 and reference to the prior description of those elements is incorporated here for FIG. 2. As with the embodiment of FIG. 1, the AC Input and EMI Filter 206 prevent internal switching noise from conducting back to the grid and source of input AC power 202.

In order to receive and operate appliances using power from the PV array 284, the rectifier 214 and the power factor correction circuit 216 must be modified from analogous circuits described and illustrated in FIGS. 1 and 3-5 to be bidirectional to enable DC power from the PV array 284 to be supplied to the power grid 202 when the PV array is generating power that is not being used by a connected appliance (load) 280. Alternatively, the PV array power supplied through the PV array interface 283 is used to supply all or part of the power requirements of the load 280 when one or more appliances are connected. When the power needed to power a load 280 is greater than can be supplied by the PV array 284, power from the grid is used to supplement power supplied by the PV array interface 283. Bidirectional power flow is enabled by replacing the bridge diodes 306 (FIG. 3) with MOSFETS in the 50 Hz AC rectifier illustrated.

The bidirectional power factor correction circuit 216 is configured to supply power to the AC output bridge (60 Hz inverter load) and filter 240 or to send power from the PV array 284 received through a PV array interface 283 to the grid 202. To accomplish this bidirectional power flow in the bidirectional power factor correction circuit, the boost diodes in the phase A and phase B circuits 322 and 324 (FIG. 5) respectively are also replaced by MOSFETs and the control algorithm programmed in the PFC controller 212 is modified to provide control signals 223 and 225 responsive to the line voltage signal indicating whether or not power is being supplied from the grid at the input AC power source 202.

Figure 3A:
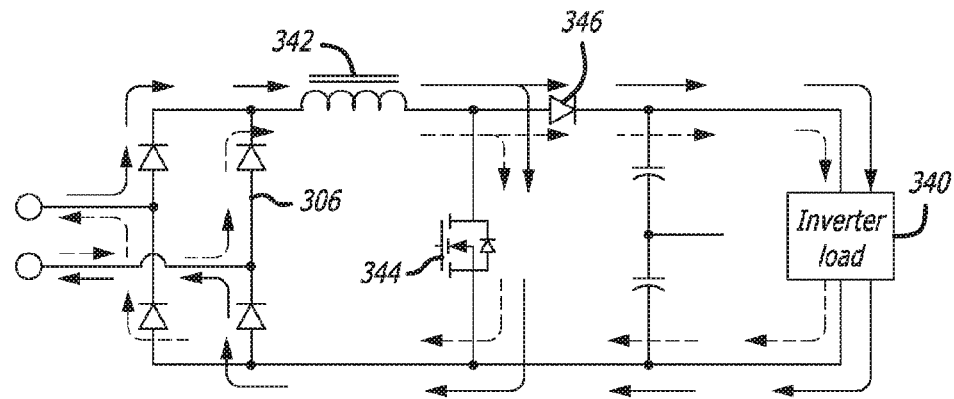
FIGS. 3A-3C are detailed description of the operation of the circuit of FIG. 3 modified to make it bidirectional.

To illustrate, FIG. 3A is a simplified schematic of the unidirectional PFC circuit shown in FIG. 3. The solid arrows indicate the current flow for the positive half cycle of a 220 VAC source and the dotted arrows indicate the current flow for the negative half cycle of the 220 VAC source. As shown, current only flows from anode to cathode through the diodes 306. Power flow is also from the 220 VAC to the inverter load 340. The average current in the inductor 342 follows the voltage waveform of the 220 VAC input. The currents through MOSFET 344 and diode 346 are pulse width modulated to create the average current waveform in the inductor 342.

Figure 3B:
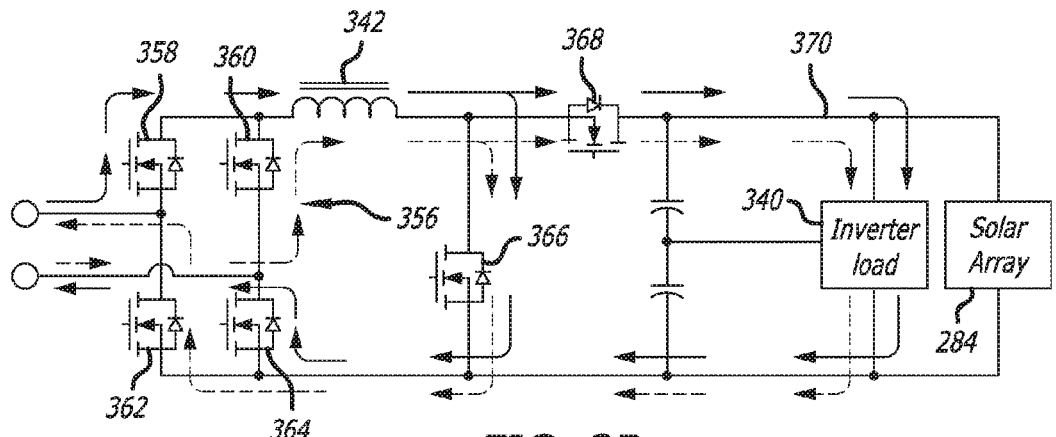

FIG. 3B illustrates the changes required to make the above unidirectional PFC circuit bi-directional as required if a solar array is connected as shown. As above indicated, the diodes 306 (FIG. 3A) are replaced by n-channel MOSFETs 356. In this illustration, the solar array 284 is not providing any power. For power flow from the 220 VAC input toward the inverter load 340, current flows through the body diodes of the MOSFETs 356 in a manner identical to the flow through diodes 306 in FIG. 3A. For reasons of power efficiency, it is desirable but not essential, to turn on MOSFETs 358 and 360 together during the positive half cycle of the 220 VAC source and MOSFETS 362 and 364 during the negative half cycle of the 220 VAC source. In the same manner as in FIG. 3A, MOSFET 366 and 368 function as a synchronous boost and are modulated by the controller 212 (FIG. 2) to create an average current waveform in the inductor 342 that follows the waveform of the 220 VAC source.

Figure 3C:
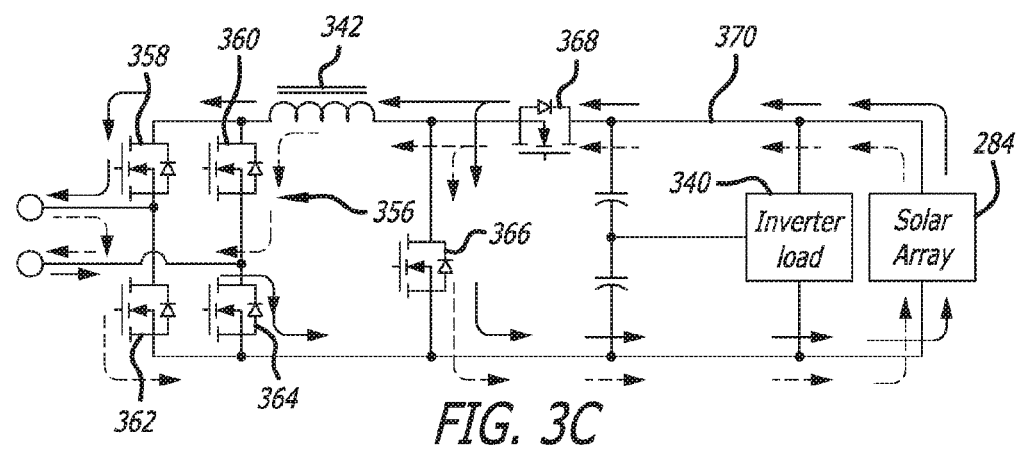

FIG. 3C illustrates current from the solar array 284 being provided to a power grid, which is the source of the input 220 VAC, when the power flow is from the solar array to the 220 VAC source. In this example, the solar array 284 is generating excess power, which is supplied to the 400V bus 370. Solid arrows indicate current flowing to the grid during the positive half cycle and the dotted arrows shows current flowing to the grid during the negative half cycle. If the power from the solar array 284 exceeds the power requirements of the load 340, the excess power will be transferred to the 220 VAC source. In this case, MOSFETs 366 and 368 function as a synchronous buck and are modulated to maintain a current waveform that also follows the 220 VAC source waveform. Because the current in the MOSFET AC bridge 356 are now flowing in the opposite direction from that illustrated in FIG. 3B (from drain to source), MOSFETS 358 and 360 are turned on together during the positive half cycle of the 220 VAC source, and MOSFETs 362 and 364 are turned on together during the negative half cycle of the 220 VAC source.

The transition of the power flow is controlled by the amplitude of power of the 400 VDC bus 370. During normal operation when power flows from the 220 VAC source to the load 340, the 400 VDC bus output of the PFC is regulated by the controller to maintain 400 VDC. If sufficient power is injected onto the 400 VDC bus 370 from the solar array 284, the voltage will increase above 400 VDC if the load is less than the capacity of the solar array. The topology of the PFC is now changed to function as in FIG. 3C to reduce the excess voltage on the 400 VDC bus by sourcing the excess power back to the 220 VAC source. The PFC remains in this mode regulating the 400 VDC bus until the load increases above the capacity of the solar array 284 causing the voltage on the 400 VDC bus 370 to decrease below the normal 400 VDC at which time, the topology is transitioned back to the normal 220 VAC source to load power flow as in FIG. 3B.

When AC output power 282 is being delivered to the load 280 from the AC output EMI filter, the PFC controller 212 insures that the input current waveform follows the input voltage (grid) waveform as previously discussed. This bidirectional power factor correction topology utilizes the phase A circuit 222 and phase B circuit 224 that are 180 degrees out of phase thereby effectively doubling the switching frequency. Using the phase A and phase B circuits also reduces the size of the boost inductors 302 and 304 and the associated boost MOSFETS 307 and 308 and boost diodes 322, 324 to divide the power dissipation between the phase A and phase B circuits. The bulk capacitors 132 are configured in series to form a voltage divider, which in one embodiment results in 200 VDC across each capacitor segment for a total of 400 VDC. The 200 VDC node is used as the reference voltage for the AC output bridge.

In the embodiment incorporating a photovoltaic array 284 and a conventional PV array interface 283, the interface 283 includes control features that, for example, automatically adjust the amount of power draw from the PV array. This is generally done by a microcontroller (or DSP) (not shown) that measures the variable current and voltage of the PV array and then adjusts the amount of current drawn from the PV array to maximize the power absorbed by the solar array while maintaining the 400 VDC output from the bidirectional power factor correction circuit 216. The PV array interface is always active. As the power available from the array varies with the available sunlight, the PFC controller 212 enables power required by the AC output bridge (inverter) and filter 240 to be supplemented by causing power to be drawn from the grid or enabling the excess power from the PV array to be directed back to the grid.

The power and system monitor 288 is coupled to receive a signal indicative of the input AC power from the power source 202, to receive a signal indicative of the output power 282 from the AC output EMI filter 264, and a power output signal from the PV array interface 283. The monitor is also coupled to the PFC controller 212 and the AC bridge controller 258 for receiving, for example, information as to the relative power outputs and control parameters.

In addition to tracking and controlling power flow in the adaptive AC power exchanger 200, the monitor 288 may be coupled to a transceiver such as Wi-Fi transceiver 286 to transmit information such as input and output power levels, operating time, energy consumption of an appliance load, internal temperatures, electricity costs and any other desired and available parameter to a remote receiver such as a smart phone (not shown).

Alarms on the adaptive AC power exchanger 200 and on the user smart phone may be incorporated to give information when there is excessive internal temperature, excessive input or output power, the amount of electricity cost savings and the reporting of other similar parameters. Furthermore, the smart phone or other remote controller can be used to alter or otherwise selective access performance measures, which may be programmed features of the AC bridge controller 258. Additionally, new features or bug corrections can be reprogrammed in the microcontroller of the AC bridge controller 258.

Figure 6:
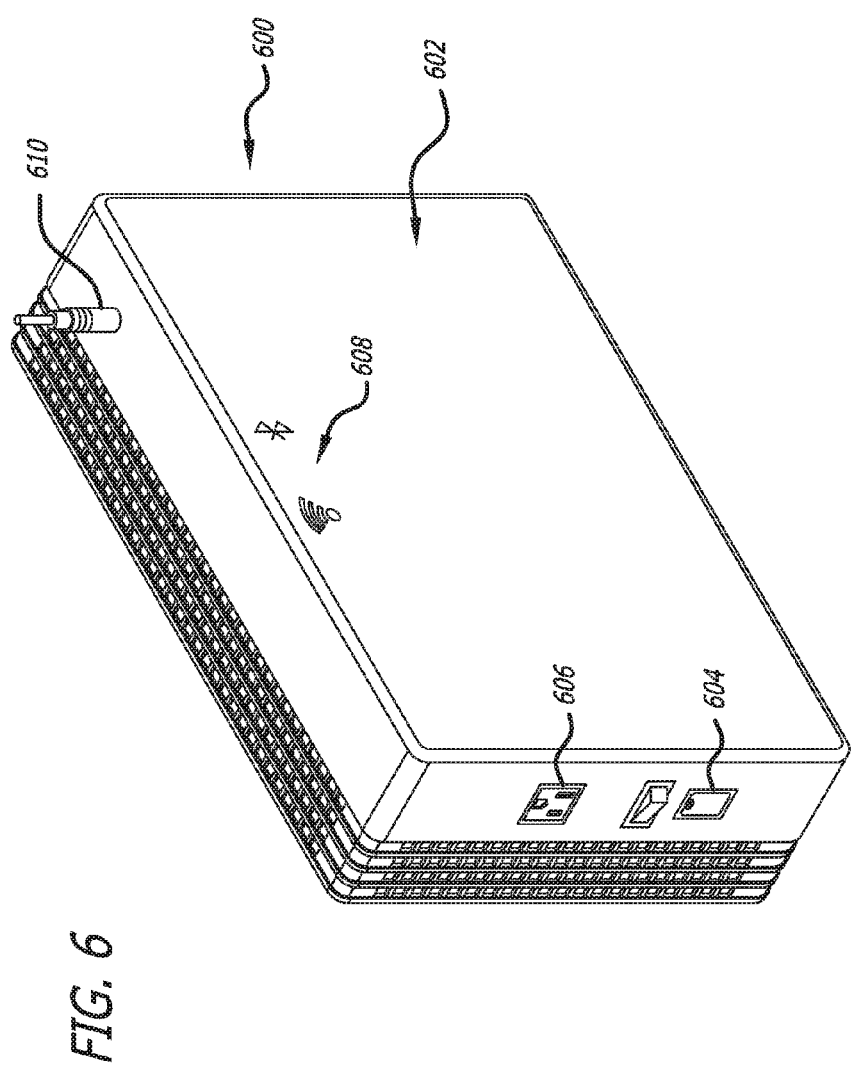
FIG. 6 is a pictorial diagram of the physical housing for an adaptive AC power exchanger according to FIG. 2 illustrating the Wi-Fi communications and solar power features.

Referring next to FIG. 6, an illustration of the adaptive AC power exchanger 600 is illustrated showing an housing 602 which is preferably enclosed to prevent dust and other contaminants from entering the interior of the housing thereby minimizing the risk of performance degradation due to such contaminants. The housing 602 also protects the electronic circuitry from being inadvertently covered or coming into contact with household items such as clothing, which could also degrade performance. The housing 602 may be attached to a wall near an appliance by attachment mechanisms (not shown) or may be free standing. The power exchanger includes an AC input plug 604 for electrically connecting the power exchanger 600 to a local power supply grid such as 220 VAC, 50 Hz power supplied by a public utility as illustrated in FIGS. 1 and 2. In the bidirectional embodiment, a DC input 610 is provided for coupling to a PV array such as PV array 284 (FIG. 2) to receive the DC generated by the PV array. Also included is an appliance plug receptor 606 to supply the output 120 VAC, 60 Hz power to operate an appliance such as a washing machine, vacuum, or refrigerator manufactured to operate on 120 VAC, 60 Hz power.

As above described, the adaptive AC power exchanger 600 may include smart grid connectivity using a Wi-Fi or Bluetooth transponder (depicted on the housing at 608) for gathering performance information such as instantaneous power usage, temperature, average power usage, computations of monetary value of the power used and the like and then communicating that information to a remote receiver such as an smart phone or home computer (not shown). In this way, the user can track and evaluate performance of the unit and plugged in appliance.

Figure 7:
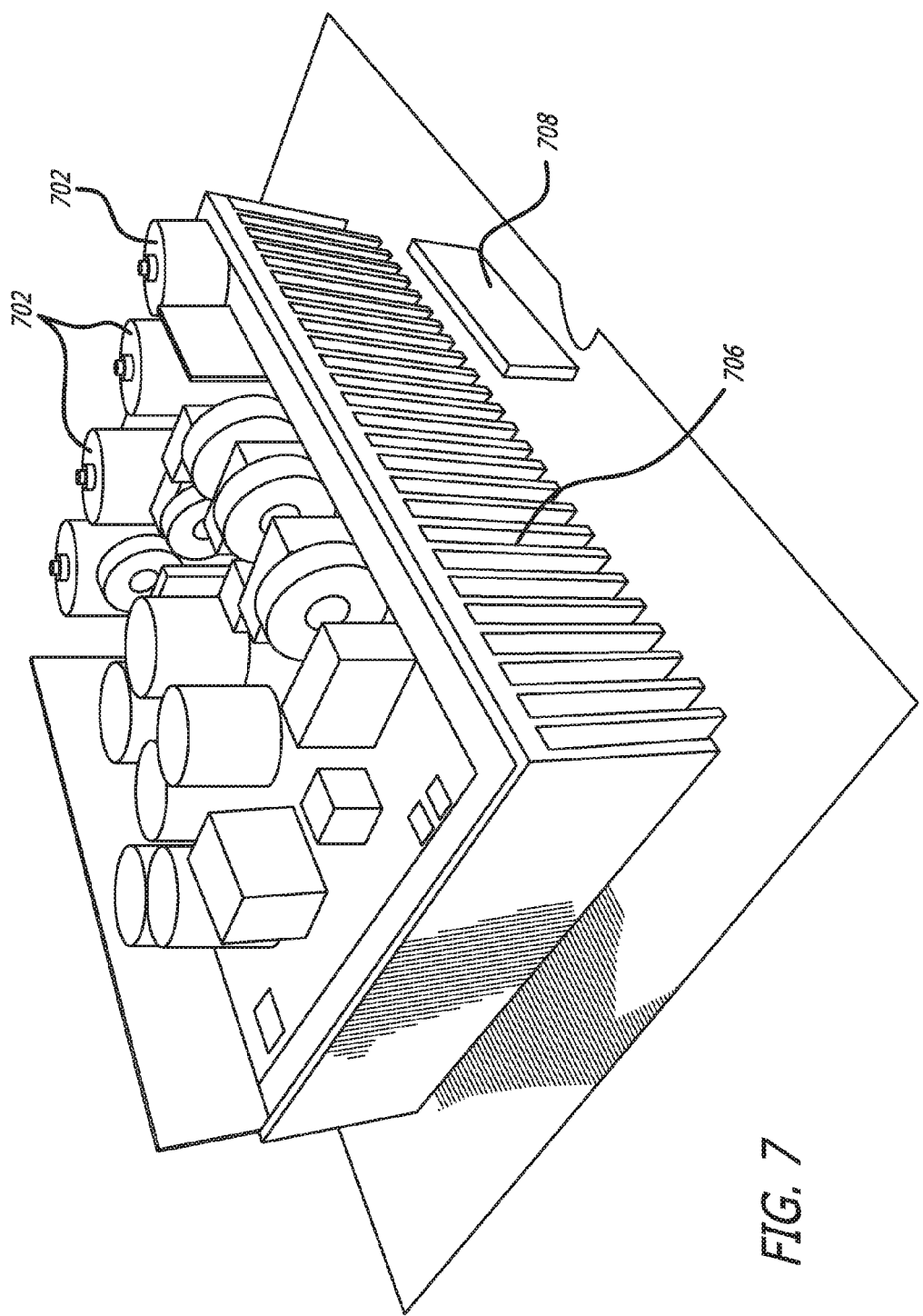
FIG. 7 is an illustration of the internal structure of the adaptive AC power exchanger illustrating the heat dissipation arrangement of the heat sink and heat generating circuit components from which heat is dissipated.

Referring to FIG. 7, a photographic illustration of the physical arrangement of an adaptive AC power exchanger shows various power components such as heat generating power inductors 702 as well as other heat generating circuit components. Because the heat generated by these components either is enclosed or generates too much heat to be passively dissipated, the components are coupled in heat-dissipating relationship to heat dissipating structures such as heat sink 706. To supplement dissipation of heat, one or more externally positioned fans 708 can be added as well. Thus, when the heat generated by the power exchanger cannot be dissipated passively by heat sink 706 while keeping the internal temperatures to the desired values, a signal can be generated by a temperature sensor to turn on fans directed toward the heat sinks to provide additional cooling. The heat sink 706 may be increased or decreased in size and in so doing the rated power output of the adaptive AC power exchanger will be increased or decreased.

Although the application describes exemplary embodiments, other embodiments will be apparent to those skilled in the art. For example, though the application has described in connection with the input power of about 220 VAC at 50 Hz and an output power of 120 VAC at 60 Hz, adaption for input power of 120 VAC at 60 Hz to output power of 220 VAC at 50 Hz is workable.

We claim:

1. An adaptive AC power exchanger for receiving input AC power from a power source providing output AC power, different from the input AC power, for a load, comprising:

an input EMI filter, coupled to receive the input AC power, for filtering high frequency noise generated internally by the adaptive AC power exchanger;

an inrush current control circuit, coupled to receive the input AC power for limiting the amplitude of the input AC power current when the input AC power is initially applied to the adaptive AC power exchanger in response to an inrush control signal;

an AC rectifier coupled to the input EMI filter for generating rectified input power characterized by a rectified input current waveform and a rectified input voltage waveform and a rectified line voltage signal;

a PFC controller coupled to receive the rectified line voltage signal from the rectifier and further coupled to generate the inrush control signal and at least one PFC control signal;

a power factor correction circuit coupled for receiving the rectified input power and the at least one PFC control signal and modifying the rectified input power so that the waveform of the rectified input current follows the wave form of the rectified input voltage and generating a first DC voltage output;

a plurality of capacitors coupled in series between the first DC voltage output and a common connection voltage for generating a second DC voltage intermediate between the first DC voltage output and the common connection voltage;

a balancing voltage circuit coupled to the plurality of capacitors for maintaining the intermediate relationship of the second DC voltage between the first DC Voltage and the common connection voltage;

an AC output bridge coupled to receive the first and second DC voltages comprising:

a pulse-width modulation circuit for generating average output AC having a value approximating the second DC voltage, a load current limit circuit coupled to receive the average output AC and limit the cycle-to-cycle current at the switching frequency of the pulse-width modulation circuit and generating load current output AC and a load current limit signal, an output dual inductor LC filter coupled to the receive the load current output AC from the load current limit circuit and having a first inductor and a second inductor coupled in parallel and a bypass relay coupled to the parallel first and second inductors for decoupling the second inductor in response to an LC filter bypass control signal when the load limited AC current applied to a load is below a predefined level, and a load disconnect relay for disconnecting the load limited output AC from the load in response to a load disconnect control signal; and the AC output bridge further comprising an AC bridge controller coupled for receiving at least the load current limit signal, the AC bridge controller programmed to generate the load disconnect control signal to open and close the load disconnect relay, an LC filter bypass control signal to open and close the output bypass relay, and at least one modulation control signal coupled to the pulse-width modulation circuit.

2. The adaptive AC power exchanger of claim 1 further comprising:

an AC output EMI filter coupled to the load disconnect relay for filtering high frequency noise from the output AC power and generating a voltage sense signal.

3. The adaptive AC power exchanger of claim 1 further comprising a monitoring processor coupled to the AC input power and the AC output power for receiving AC input power information and AC output power information, and further coupled to the PFC controller for obtaining information indicative of the performance of the adaptive AC power exchanger.

4. The adaptive AC power exchanger of claim 3 further comprising communication means coupled to the monitoring processor for communicating the performance information to a remote location.

5. The adaptive AC power exchanger of claim 1 where at least one of the input EMI filter, the inrush current control circuit, the rectifier, the power factor correction circuit, the PFC controller, the plurality of series connected capacitors, the bias and balancing voltage circuit, the AC output bridge and the AC output EMI filter comprising the AC power exchanger electronic circuitry includes a plurality of heat generating components, the adaptive AC power exchanger further comprising:

a housing comprising an electronic circuit mounting base have top side and a bottom side opposite the top side, at least some of the heat generating components of the adaptive AC power exchanger circuits being mounted to the top side of the mounting base, a heat sink selected to dissipate heat generated by the heat generating components, the heat sink attached to the bottom side of the mounting base, the heat generating components being mounted in heat transmission relationship with the heat sink.

6. The adaptive AC power exchanger of claim 5 further comprising:

a fan positioned outside the housing in proximity to the heat sink for enhancing dissipation of heat from the heat sink when the fan is turned on, and a temperature sensor coupled to sense the temperature of the heat generating components and turn on the fan when the heat exceeds a predefined temperature.

7. The adaptive AC power exchanger of claim 5 wherein the heat sink is selected to dissipate sufficient heat to enable the adaptive AC power exchanger to operate at full rated power.

8. The adaptive AC power exchanger of claim 5 wherein the housing is configured to seal the adaptive AC power exchanger circuitry from exposure to environmental contaminants outside the housing during operation of the adaptive AC power exchanger for preventing contaminants from reducing the operating efficiency of the adaptive AC power exchanger.

9. The adaptive AC power exchanger of claim 1 further comprising a DC power input for receiving DC power generated from a photovoltaic array and supplying power to the load.

10. The adaptive AC power exchanger of claim 1 where in the input AC power is about 220 VAC at 50 Hz and the output AC power is about 120 VAC at 60 Hz.

11. The adaptive AC power exchanger of claim 1 where in the input AC power is about 120 VAC at 60 Hz and the output AC power is about 220 VAC at 50 Hz.

12. An adaptive AC power exchanger for being positioned between a power source and a load for converting input AC power from the power source into output AC power for the load and for further receiving DC power from a photovoltaic array through a PV array interface for selectively providing power to the load, the power source or both the power source and the load, comprising:

an inrush current control circuit responsive to an inrush control signal, the inrush current control circuit coupled to the input AC power for limiting the amplitude of the input AC power current when the input AC power is initially applied to the adaptive AC power exchanger;

a rectifier coupled to the input AC power for generating rectified input power characterized by rectified input current waveform and a rectified input voltage waveform and a rectified line voltage signal;

a PFC controller coupled to receive rectified line voltage signal and further coupled to generate the inrush control signal and at least one PFC control signal;

a bidirectional power factor correction circuit coupled for receiving the rectified input power and the at least one PFC control signal and modifying the rectified input power so that the waveform of the rectified input current follows the wave form of the rectified input voltage and providing a first DC voltage output, and further coupled to receive DC power from a photovoltaic array and therefrom selectively providing power to the load, power to the power source or power to both the load and the power source;

a plurality of capacitors connected in series between the first DC voltage output and ground for generating a second DC voltage intermediate between the first DC voltage output and a common connection voltage;

a balancing voltage circuit coupled to the plurality of capacitors for maintaining the intermediate relationship of the second DC voltage between the first DC voltage and the common connection voltage;

an AC output bridge coupled to receive the first and second DC voltages comprising a pulse-width modulation circuit for generating output AC voltage referenced to the second DC voltage, a load current limit circuit coupled to receive the output AC and limit the cycle-to-cycle frequency at the switching frequency of the pulse-width modulation circuit and generating a load current limit signal, an output dual inductor LC filter coupled to the load current output AC and having a first inductor and a second inductor coupled in parallel and a bypass relay coupled to the parallel first and second inductors for decoupling the second inductor in response to an LC filter bypass control signal when the load limited AC current applied to a load is below a predefined level, and a load disconnect relay for disconnecting the load limited output AC from the load in response to a load disconnect control signal; and the AC output bridge further comprising an AC bridge controller coupled for receiving at least the load current limit signal, the AC bridge controller programmed to generate the load disconnect control signal to open and close the load disconnect relay, the LC filter bypass control signal to open and close the output bypass relay, and at least one modulation control signal to the pulse-width modulation circuit.

13. The adaptive AC power exchanger of claim 12 further comprising:
    an input EMI filter, coupled to receive the input AC power for filtering high frequency noise generated internally by the adaptive AC power exchanger; and
    an AC output EMI filter coupled to the load disconnect relay for filtering high frequency noise from the output AC power and generating a voltage sense signal.

14. The adaptive AC power exchanger of claim 12 further comprising a monitoring processor coupled to receive and process AC input power information from the AC input, AC output power information from the AC output, PV array interface information from the PV array interface and PFC controller information from the PFC controller to obtain performance information indicative of the performance of the adaptive AC power exchanger.

15. The adaptive AC power exchanger of claim 14 further comprising an information transceiver coupled to the monitoring processor for transmitting the performance information to a remote receiver.

16. The adaptive AC power exchanger of claim 15 wherein the information transceiver is coupled to receive instructions from the remote receiver for selectively modifying the operation of the adaptive AC power exchanger.

17. An adaptive AC power exchanger generating output AC current for a load from input AC current from a power source, comprising:
    an AC-DC circuit stage coupled to receive the input AC current comprising:
    a 50 Hz AC rectifier couple to generate rectified power characterized by a rectified input current waveform and a rectified input voltage waveform;
    a power factor correction circuit coupled for receiving and modifying the rectified input power so that the waveform of the rectified input current follows the waveform of the rectified input voltage, the power factor correction circuit generating a first VDC output; and
    a plurality of capacitors coupled in series between the first VDC output and common connection voltage for generating a second VDC output intermediate between the first VDC output and common connection voltage defining a VDC inverter bias voltage; and
    a DC-AC circuit stage comprising:
    a pulse-width modulation inverter circuit coupled to receive the first VDC output and the VDC inverter bias voltage and generating an average output AC at 60 Hz;
    a load current limit circuit coupled to receive the average output AC and limit the cycle-to-cycle frequency at the switching frequency of the pulse-width modulation inverter circuit; and
    an output dual inductor LC filter coupled to the average output AC, the output dual LC filter having a first inductor and a second inductor coupled in parallel and a bypass relay coupled to the parallel first and second inductors for selectively coupling and decoupling the second inductor in response to the output VAC applied to a load.

18. The adaptive AC power exchanger of claim 17 further comprising:
    an input EMI filter coupled between the source of input AC power and the AC rectifier for filtering high frequency noise generated internally by the adaptive AC power exchanger from the input AC power source.

19. The adaptive AC power exchanger of claim 18 further comprising:
    an inrush current control circuit coupled to the input EMI filter for limiting the amplitude of the input AC when the input AC power is initially applied to the adaptive AC power exchanger.

20. The adaptive AC power exchanger of claim 17 wherein the 50 Hz AC rectifier generates a rectified line voltage signal indicating the line voltage, the adaptive AC power exchanger further comprising:
    a PFC controller coupled to receive the rectified line voltage signal from the AC rectifier and further coupled to generate at least one PFC control signal for controlling the rectified input power so that the waveform of the rectified input current follows the wave form of the rectified input voltage.

21. The adaptive AC power exchanger of claim 20 wherein the PFC controller further generates the inrush control signal in response to amount of current entering the AC rectifier.

22. The adaptive AC power exchanger of claim 17 further comprising a balancing voltage circuit coupled to the plurality of capacitors for maintaining the intermediate relationship of the VDC inverter bias voltage between the first DC Voltage and the common connection voltage.

23. The adaptive AC power exchanger of claim 17 further comprising
    a load disconnect relay for disconnecting the output AC power from the load in response to a load disconnect control signal when the current drawn by the load is greater than a predefined amount.

24. The adaptive AC power exchanger of claim 17 further comprising an AC output EMI filter coupled between the load and the DC-AC circuit for filtering high frequency noise from the output AC current and for generating a voltage sense signal indicative of the voltage of the output AC current.

25. The adaptive AC power exchanger of claim 24 wherein the load current limit circuit generates a load current limit signal indicative the current from the load current limit circuit the adaptive AC power exchanger further comprising
    a load disconnect relay for disconnecting the output AC current from the load in response to a load disconnect control signal when the current drawn by the load is greater than a predefined amount; and
    an AC bridge controller coupled for receiving the voltage sense signal and the load current limit signal and generating the load disconnect control signal to open and close the load disconnect relay, an LC filter bypass control signal to open and close the inductor bypass relay, and at least one modulation control signal coupled to the pulse-width modulation circuit.

26. The adaptive AC power exchanger of claim 17 wherein input AC power is variable between about 180 VAC and 280 VAC and about 50 Hz and the output AC power is substantially constant at about 120 VAC and 60 Hz.

27. The adaptive AC power exchanger of claim 17 wherein input AC power is variable at about 120 VAC and 60 Hz and the output AC power is substantially constant at about 220 VAC and 50 Hz.

28. An adaptive AC power exchanger generating output AC current for a load from input AC current from a power source, comprising:
    an AC-DC circuit stage coupled to receive the input AC current and generate a first VDC output, and a DC-AC circuit stage comprising:
a pulse-width modulation inverter circuit coupled to receive the first VDC output and generating an average output AC at 60 Hz;
a load current limit circuit coupled to receive the average output AC and limit the cycle-to-cycle frequency at the switching frequency of the pulse-width modulation inverter circuit; and
an output dual inductor LC filter coupled to the average output AC, the output dual LC filter having a first inductor and a second inductor coupled in parallel and a bypass relay coupled to the parallel first and second inductors for selectively coupling and decoupling the second inductor in response to the output VAC applied to a load.

29. The adaptive AC power exchanger of claim 28 wherein input AC power is variable between about 180 VAC and 280 VAC and about 50 Hz and the output AC power is substantially constant at about 120 VAC and 60 Hz.

30. The adaptive AC power exchanger of claim 28 wherein input AC power is variable at about 120 VAC and 60 Hz and the output AC power is substantially constant at about 220 VAC and 50 Hz.

* * * * *